United States Patent
Ravn et al.

(10) Patent No.: US 12,313,031 B2
(45) Date of Patent: May 27, 2025

(54) WIND TURBINE BLADE AND METHOD OF MANUFACTURING A WIND TURBINE BLADE

(71) Applicant: LM WIND POWER US TECHNOLOGY APS, Kolding (DK)

(72) Inventors: Morten Ravn, Egtved (DK); Peter Hansen, Kolding (DK); Simon Berg Bojesen, Billund (DK); Casper Skovby, Roskilde (DK); Mads Døssing, Kolding (DK); Peter Bæk, Kolding (DK); Christian Frank Andersen, Kolding (DK); Michael Klitgaard, Odense S (DK); Mark Olaf Slot, Odense sV (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 0 days.

(21) Appl. No.: 17/826,448

(22) Filed: May 27, 2022

(65) Prior Publication Data

US 2023/0084177 A1 Mar. 16, 2023

Related U.S. Application Data

(63) Continuation-in-part of application No. 16/312,681, filed on Dec. 21, 2018, now abandoned.

(51) Int. Cl.
*F03D 1/06* (2006.01)

(52) U.S. Cl.
CPC ......... *F03D 1/0675* (2013.01); *F03D 1/0679* (2023.08); *F03D 1/0688* (2023.08);
(Continued)

(58) Field of Classification Search
None
See application file for complete search history.

(56) References Cited

U.S. PATENT DOCUMENTS 7,811,063 B2 * 10/2010 Bonnet ............... F03D 1/0675
416/500
7,837,439 B2 * 11/2010 Bech .................. F03D 1/0675
416/62
(Continued)

FOREIGN PATENT DOCUMENTS

AU 2010294625 A1 7/2011
KR 101520898 B1 5/2015
(Continued)

OTHER PUBLICATIONS

International Search Report dated Sep. 7, 2017 issued in corresponding International Application No. PCT/EP2017/065570 (from the parent application).
(Continued)

*Primary Examiner* — Sabbir Hasan
*Assistant Examiner* — Esley Le Fisher
(74) *Attorney, Agent, or Firm* — Nath, Goldberg & Meyer; Jerald L. Meyer; Tanya E. Harkins (57) ABSTRACT

A wind turbine blade includes a profiled contour with a leading edge and a trailing edge, and a chord extending between the leading edge and the trailing edge, along with a blade shell with a pressure side and a suction side, a first main spar cap integrated in the pressure side of the blade shell, a second main spar cap integrated in the suction side of the blade shell, and one or more shear webs connected between the first main spar cap and the second main spar cap. The blade shell includes at least a first load carrying structure arranged at the leading edge or the trailing edge and having a first extension, including a first primary extension on a first side of the chord, where the first primary extension is at least 60% of the first extension.

15 Claims, 7 Drawing Sheets

(52) U.S. Cl.
CPC ............ *F03D 1/069* (2023.08); *F03D 1/0682* (2023.08); *F05B 2230/23* (2013.01); *F05B 2280/6013* (2013.01)

(56) References Cited

U.S. PATENT DOCUMENTS

| | | | | |
|---|---|---|---|---|
| 8,172,542 | B2* | 5/2012 | Hirano | F03D 1/0675 416/241 A |
| 8,540,491 | B2* | 9/2013 | Gruhn | F03D 80/00 416/230 |
| 9,541,061 | B2* | 1/2017 | Sievers | F03D 1/0675 |
| 10,137,542 | B2* | 11/2018 | Upton | B29C 70/083 |
| 10,487,797 | B2* | 11/2019 | Hancock | B29C 70/865 |
| 11,161,208 | B2* | 11/2021 | Upton | F03D 80/00 |
| 2011/0031757 | A1* | 2/2011 | Mitsuoka | F03D 1/0675 290/55 |
| 2012/0061007 | A1* | 3/2012 | Gunther | B29C 66/1142 156/94 |
| 2015/0151390 | A1* | 6/2015 | Upton | B29C 70/023 29/889.7 |
| 2015/0198141 | A1 | 7/2015 | Hayden et al. | |
| 2015/0252779 | A1* | 9/2015 | Sievers | F03D 1/0675 416/229 R |
| 2018/0297308 | A1* | 10/2018 | Hedges | D04H 3/115 |

FOREIGN PATENT DOCUMENTS

| | | | |
|---|---|---|---|
| WO | 8100993 | A1 | 4/1981 |
| WO | 9943955 | A1 | 9/1999 |
| WO | WO-2015158346 | A1 * | 10/2015 ............ F03D 1/065 |

OTHER PUBLICATIONS

Indian First Examination Report dated Mar. 30, 2021 corresponding to application No. 201947002933 (from the parent application).

* cited by examiner

WIND TURBINE BLADE AND METHOD OF MANUFACTURING A WIND TURBINE BLADE

CROSS-REFERENCE TO RELATED APPLICATION

This application is a continuation-in-part of U.S. application Ser. No. 16/312,681, filed on Dec. 21, 2018, which is a national phase application filed under 35 U.S.C. § 371 as the national stage of PCT Application No. PCT/EP2017/065570, filed on Jun. 23, 2017, which claimed the benefit of European Application No. 16176180.4, filed on Jun. 24, 2016, the content of each of which is hereby incorporated by reference in its entirety.

BACKGROUND

1. Field

The disclosure of the present patent application relates to wind turbine blades, and particularly to a wind turbine blade with improved dynamic properties, and a method of manufacturing the wind turbine blade.

2. Description of the Related Art

Wind turbine blades of fiber-reinforced polymer and, in particular, the aerodynamic shells of wind turbine blades are usually manufactured in molds, where the pressure side and the suction side of the blade are manufactured separately by arranging glass fiber mats and/or other fiber-reinforcement material, such as carbon fiber, in each of the two mold parts. Then, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Molding (VARTM), where a plurality of fiber mats are arranged on top of a rigid mold parts and possibly also a core material to provide parts having a sandwich structure. When the fiber mats have been stacked and overlapped so as to form the final shape of the wind turbine blade shell part, a flexible vacuum bag is arranged on top of the fiber mats and sealed against the rigid mold part, thereby forming a mold cavity containing the fiber mats. Resin inlets and vacuum outlets are connected to the mold cavity. First the mold cavity is evacuated via the vacuum outlets so as to form an under-pressure in the mold cavity, after which a supply of liquid resin is supplied via the resin inlets. The resin is forced into the mold cavity due to the pressure differential and impregnates the fiber material of the fiber mats. When the fiber material has been fully impregnated, the resin is cured in order to form the final composite structure, i.e., the blade shell part.

Wind turbine blades have become increasingly longer over the years and blades having a length of more than 70 meters are now commercially available on the market. This also means that the requirements to the mechanical strength of the wind turbine blade have increased dramatically. Due to the large size, it has become increasingly complicated to manufacture wind turbine blades with desired mechanical strength and in particular to provide a wind turbine blade with satisfactory dynamic properties. Thus, a wind turbine blade and a method of manufacturing the wind turbine blade solving the aforementioned problems are desired.

SUMMARY

A wind turbine blade is provided having a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the pressure side and the suction side, e.g. between the first main spar cap and the second main spar cap. The blade shell includes at least a first load carrying structure arranged at the leading edge or the trailing edge of the wind turbine blade. The first load carrying structure optionally has a first extension including a first primary extension on a first side of the chord or on a first side of a glue joint of the wind turbine blade or on a first blade shell part of the wind turbine blade. The first primary extension may be at least 60% of the first extension.

Also provided is a method of manufacturing a wind turbine blade including a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the first main spar cap and the second main spar cap. The method includes arranging a first reinforcement fiber layup at the leading edge or the trailing edge, wherein the first reinforcement fiber layup has a first extension including a first primary extension on a first side of the chord or on a first blade shell part, wherein the first primary extension is at least 60% of the first extension.

A wind turbine blade extends from a root end to a tip end along a longitudinal axis and includes a root region, a transition region, and an airfoil region. The transition region of the wind turbine blade includes a shoulder defining a maximum chord of the wind turbine blade.

The present disclosure advantageously relates to wind turbine blades and manufacture of wind turbine blades, e.g., having a blade length of at least 40 meters, or at least 45 meters, or even at least 50 meters. The wind turbine blade may be prebent so that, when mounted on an upwind configured horizontal wind turbine in a non-loaded state, they will curve forward out of the rotor plane so that the tip to tower clearance is increased. A wind turbine blade has a leading edge and a trailing edge with an inner surface and an outer surface. The inner surface of a wind turbine blade is a surface that is not exposed to the surroundings. The outer surface of a wind turbine blade is a surface that is exposed to the surroundings.

The wind turbine blade includes a profiled contour with a leading edge and a trailing edge and a chord extending between the leading edge and the trailing edge. Touching points of the chord on the leading edge form a leading edge chord line and touching point of the chord on the trailing edge form a trailing edge chord line.

The wind turbine blade includes a first main spar cap integrated in the pressure side of the blade shell and a second main spar cap integrated in the suction side of the blade shell. One or more shear webs, such as a first shear web and/or a second shear web, are connected between the first main spar cap and the second main spar cap.

The wind turbine blade may include a first secondary spar cap integrated in the pressure side of the blade shell. The wind turbine blade may include a second secondary spar cap integrated in the suction side of the blade shell, The blade shell includes one or more load carrying structures, such as the first load carrying structure and/or a second load carrying structure. A load carrying structure, such as the first load carrying structure and/or a second load carrying structure, includes reinforcement material, e.g., one or more layers of reinforcement material.

A layer of reinforcement material may have a first elastic modulus E1 in a first direction and a second elastic modulus E2 in a second direction perpendicular to the first direction. In one or more exemplary wind turbine blades, E1/E2>2.0, e.g., E1/E2>2.3 or E1/E2>2.6. In one or more advantageous wind turbine blades, E1/E2>3.0. The reinforcement material may include any type of reinforcement fibers suitable for reinforcing large composite structures, such as glass fibers, carbon fibers and/or aramid fibers. The reinforcement material or layer(s) of reinforcement material may include unidirectional fibers, biaxial fibers, triaxial fibers or randomly oriented fibers. In one or more advantageous wind turbine blades, a load carrying structure, such as the first load carrying structure and/or a second load carrying structure, includes one or more unidirectional fiber layers. Unidirectional fibers or a unidirectional fiber layer may have at least 75% of the fibers (weight or volume) in one direction (±15 degrees), such as at least 90% of the fibers in one direction (±15 degrees).

A load carrying structure, such as the first load carrying structure and/or the second load carrying structure, may have a length of at least 5 m, such as at least 7 m. In one or more exemplary wind turbine blades, the first load carrying structure and/or the second load carrying structure has a length of at least 10 m. A load carrying structure, such as the first load carrying structure and/or the second load carrying structure, may have a length of at least 0.1*L, wherein L is the length of the wind turbine blade. In one or more exemplary wind turbine blades, the first load carrying structure and/or the second load carrying structure, may have a length of at least 0.15*L or at least 0.2*L, wherein L is the length of the wind turbine blade. In one or more exemplary wind turbine blades, the first load carrying structure and/or the second load carrying structure, may have a length of at least 0.3*L or at least 0.5*L, wherein L is the length of the wind turbine blade.

The first load carrying structure and/or the second load carrying structure enables the blade designer to modify and tailor the dynamic behavior of the wind turbine blade.

The blade shell includes at least a first load carrying structure arranged at the leading edge or the trailing edge.

A load carrying structure may be arranged at the leading edge when the load carrying structure at least partly extends within a distance less than 0.2*c from the leading edge along the chord, where c is the chord length. In one or more exemplary wind turbine blades, a load carrying structure is arranged at the leading edge when the load carrying structure at least partly extends within a distance less than 0.1*c from the leading edge along the chord, where c is the chord length.

A load carrying structure may be arranged at the trailing edge when the load carrying structure at least partly extends within a distance less than 0.3*c from the trailing edge along the chord, where c is the chord length. In one or more exemplary wind turbine blades, a load carrying structure is arranged at the trailing edge when the load carrying structure extends within a distance less than 0.1*c from the trailing edge along the chord, where c is the chord length.

The first load carrying structure may be asymmetric about the leading edge chord line or the trailing edge chord line. In one or more exemplary wind turbine blades, the first load carrying structure is asymmetric at the leading edge with respect to the chord or with regard to a glue joint.

Different numbers and/or distribution of reinforcement material layers on different sides of the chord or on different sides of a glue joint or on different blade shell parts may employ an asymmetric load carrying structure. Additionally, or alternatively, reinforcement material layers with varying size (extension) may provide an asymmetric load carrying structure.

The first load carrying structure, e.g., in one or more cross-sections, such as a first cross-section and/or a second cross-section, perpendicular to the longitudinal axis, has a first extension including a first primary extension on a first side of the chord or on a first side of a glue joint, such as a leading edge glue joint at the leading edge or a trailing edge glue joint at the trailing edge. The first side may be the pressure side of the wind turbine blade.

The first cross-section may be at a first distance from a root end of the wind turbine blade. The second cross-section may be at a second distance from the root end of the wind turbine blade. The first distance may be in the range from 0 to 20 m, such as 10 m. The first distance may be in the range from 0 to 0.25*L, where L is the blade length. The second distance may be in the range from 20 m to 40 m, such as 30 m. The second distance may be larger than 0.2*L, such as in the range from 0.25*L to 0.8*L, where L is the blade length. The difference between the first distance and the second distance may be at least 2 m, such as at least 5 m.

A load carrying structure, such as the first load carrying structure and/or the second load carrying structure, may have different extensions in different cross-sections, e.g., in the first cross-section and the second cross-section. For example, the extension of a load carrying structure, such as the first load carrying structure and/or the second load carrying structure, may decrease, e.g., stepwise, from a first cross-section to a second cross-section, e.g., where the first cross-section is closer to that root end than the second cross-section.

The first primary extension may be at least 60% of the first extension, such as at least 70% of the first extension. In one or more exemplary wind turbine blades, the first primary extension is about 80% of the first extension or at least 80% of the first extension. The first primary extension may constitute the first extension, i.e., be 100% of the first extension.

The first primary extension may be in the range from 10 cm to about 200 cm, such as in the range from 50 cm to 150 cm, such as about 80 cm. In an exemplary wind turbine blade, the first primary extension is at least 50 cm, such as at least 200 cm.

The first extension of the first load carrying structure may include a first secondary extension on a second side of the chord on a second side of a glue joint, such as the leading edge glue joint or the trailing edge glue joint if present. The first secondary extension may be less than 40% of the first extension, such as less than 30% of the first extension. In one or more exemplary wind turbine blades, the first secondary extension is about 20% of the first extension or less than 20% of the first extension. In one or more exemplary wind turbine blades, the first secondary extension is larger than 5% of the first extension.

The first secondary extension may be in the range from 10 cm to 100 cm, such as in the range from 15 cm to 50 cm. In one or more exemplary wind turbine blades, the first secondary extension is about 20 cm.

In one or more exemplary wind turbine blades, the first load carrying structure is arranged at the leading edge, the first side is the pressure side, and the first primary extension is optionally at least 80% of the first extension.

In one or more exemplary wind turbine blades, the first load carrying structure is arranged at the trailing edge, the first side is the suction side, and the first primary extension is optionally at least 80% of the first extension.

The first load carrying structure may, e.g., in one or more cross-sections, such as a first cross-section and/or a second cross-section, perpendicular to the longitudinal axis, include at least 5 layers of reinforcement material, preferably at least 10 layers of reinforcement material.

In one or more exemplary wind turbine blades, the first load carrying structure may, e.g., in the first cross-section and/or in the second cross-section, include at least 20 layers of reinforcement material.

The first load carrying structure may include N1 layers of reinforcement material on a first side of the chord or on a first side of a glue joint of the wind turbine blade or on a first blade shell part of the wind turbine blade. N1 may be in the range from 5 to 50, such as at least 10.

The first load carrying structure may include N2 layers of reinforcement material on a second side of the chord or on a second side of a glue joint of the wind turbine blade or on a second blade shell part of the wind turbine blade. N2 may be in the range from 1 to 50, such as at least 10. N2 may be less than N1.

The blade shell may include a second load carrying structure arranged at the leading edge or the trailing edge.

The second load carrying structure may be asymmetric about the leading edge chord line or the trailing edge chord line. In one or more exemplary wind turbine blades, the second load carrying structure is asymmetric at the trailing edge with regard to the chord or with regard to a glue joint.

The second load carrying structure may, e.g., in the first cross-section and/or the second cross-section, have a second extension including a second primary extension on a second side of the chord or on a second side of a glue joint, such as a leading edge glue joint at the leading edge or a trailing edge glue joint at the trailing edge. The second side may be the suction side of the wind turbine blade.

The second primary extension may be at least 60% of the second extension, such as at least 70% of the second extension. In one or more exemplary wind turbine blades, the second primary extension is about 75% of the second extension or at least 75% of the second extension. The second primary extension may constitute the second extension, i.e., be 100% of the second extension.

The second primary extension may be in the range from 10 cm to about 150 cm, such as in the range from 80 cm to 130 cm. In an exemplary wind turbine blade, the second primary extension is at least 50 cm, such as about 120 cm.

The second extension of the second load carrying structure may include a second secondary extension on a first side of the chord and/or on a first side of a glue joint, such as the leading edge glue joint or the trailing edge glue joint if present. The second secondary extension may be less than 40% of the second extension, such as less than 30% of the second extension. In one or more exemplary wind turbine blades, the second secondary extension is about 25% of the second extension or less than 25% of the second extension.

In one or more exemplary wind turbine blades, the second secondary extension is larger than 5% of the second extension.

The second secondary extension may be in the range from 10 cm to about 100 cm, such as in the range from 20 cm to 60 cm. In an exemplary wind turbine blade, the second secondary extension is about 40 cm.

In one or more exemplary wind turbine blades, the second load carrying structure is arranged at the trailing edge, the second side is the suction side, and the second primary extension is optionally at least 80% of the first extension.

The second load carrying structure may, e.g., in the first cross-section and/or the second cross-section, include at least 5 layers of reinforcement material, preferably at least 10 layers of reinforcement material.

In one or more exemplary wind turbine blades, the second load carrying structure may, e.g., in the first cross-section and/or in the second cross-section, include at least 20 layers of reinforcement material.

The second load carrying structure may include M1 layers of reinforcement material on a second side of the chord or on a second side of a glue joint of the wind turbine blade or on a second blade shell part of the wind turbine blade. M1 may be in the range from 5 to 50, such as at least 10.

The second load carrying structure may include M2 layers of reinforcement material on a first side of the chord or on a first side of a glue joint of the wind turbine blade or on a first blade shell part of the wind turbine blade. M2 may be in the range from 1 to 50, such as at least 10. M2 may be less than M1.

An extension may be measured perpendicular to the longitudinal direction of the wind turbine blade. An extension may be measured as the mean extension of different layers of a load carrying structure or a weighted sum of the extension of different layers.

The first load carrying structure and/or the second load carrying structure may be integrated in the blade shell.

The wind turbine blade may include a first blade shell part and a second blade shell part. The first blade shell part and the second blade shell part may be joined along one or more glue joints, such as a leading edge joint and a trailing edge glue joint. The first load carrying structure may be arranged in the first blade shell part. In one or more exemplary wind turbine blades, the first primary extension is in the first blade shell part and the first secondary extension is in the second blade shell part. In one or more exemplary wind turbine blades, the first extension is in the first blade shell part. The second load carrying structure may be arranged in the second blade shell part. In one or more exemplary wind turbine blades, the second primary extension is in the second blade shell part and the second secondary extension is in the first blade shell part. In one or more exemplary wind turbine blades, the second extension is in the second blade shell part.

The disclosed method includes arranging a first reinforcement fiber layup at the leading edge or the trailing edge. Arranging a first reinforcement fiber layup may include or consist of arranging a first primary reinforcement fiber layup at the leading edge of a first blade shell part. A reinforcement fiber layup may include a plurality of reinforcement material layers such as at least 10 layers, e.g., in a first cross-section and/or in a second cross-section.

Arranging a first reinforcement fiber layup may include or consist of arranging a first primary reinforcement fiber layup at the trailing edge of a second blade shell part of the wind turbine blade.

The method may include arranging a first reinforcement fiber layup at the leading edge or the trailing edge. Arranging a first reinforcement fiber layup may include or consist of arranging a first primary reinforcement fiber layup at the leading edge of a first blade shell part. Arranging a first reinforcement fiber layup may include arranging a first secondary reinforcement fiber layup at the leading edge of a second blade shell part.

The first primary extension, i.e., the extension of first primary reinforcement fiber layup, may be on a first blade shell part of the wind turbine. The first extension may include a first secondary extension on a second blade shell part of the wind turbine blade.

The method may include arranging a second reinforcement fiber layup at the trailing edge, wherein the second reinforcement fiber layup has a second extension including a second primary extension on a second side of the chord, wherein the second primary extension is at least 60% of the second extension.

The method optionally includes supplying resin to the first and/or second reinforcement fiber layup and curing the resin to form a first blade shell part and/or a second blade shell part.

The method may include joining first and second blade shell parts of the wind turbine blade. The method may be a method of manufacturing a wind turbine blade as described herein.

These and other features of the present subject matter will become readily apparent upon further review of the following specification.

DETAILED DESCRIPTION OF THE PREFERRED EMBODIMENTS

Figure 1:
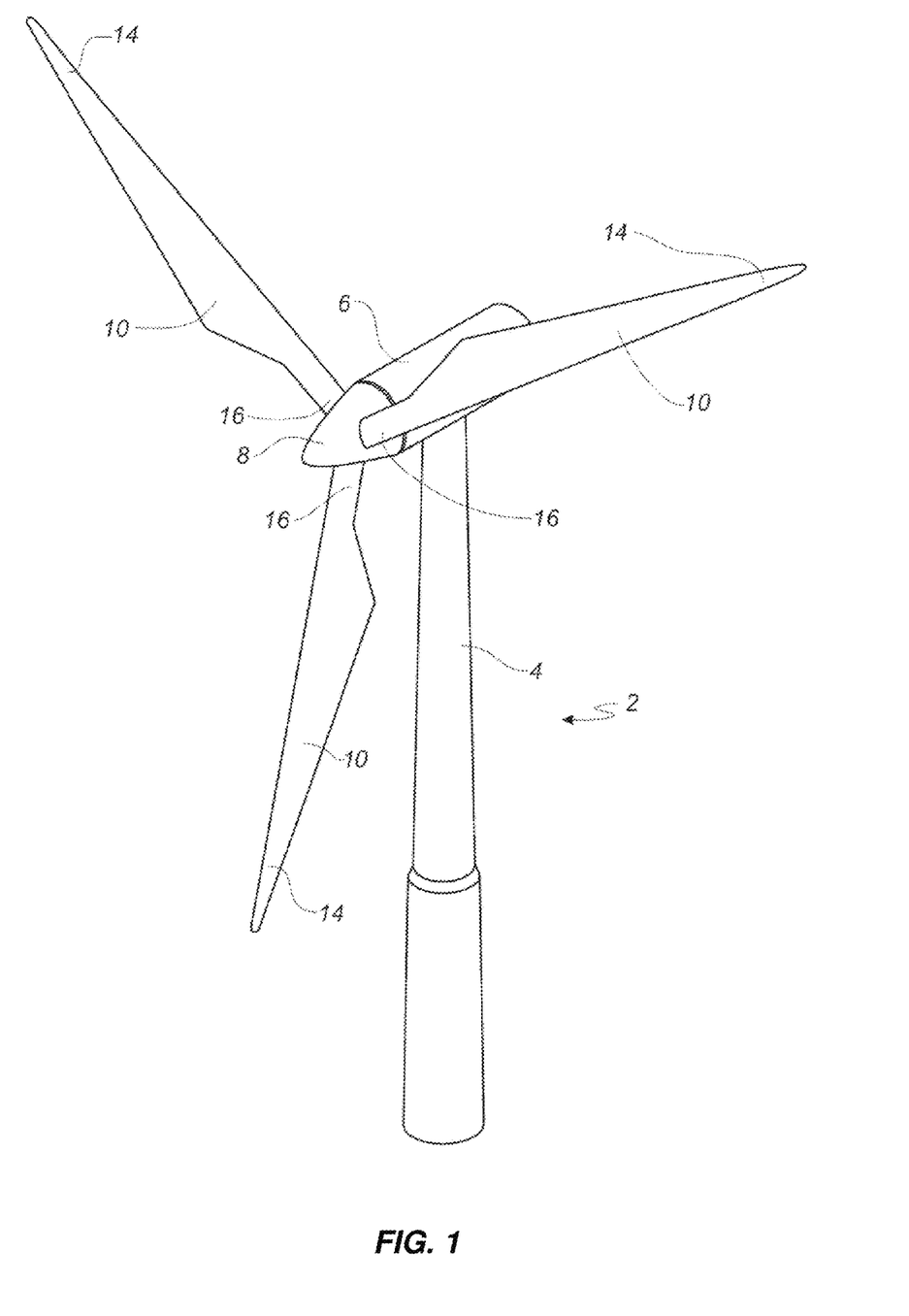
FIG. 1 shows a wind turbine.

The present invention relates to manufacture of blade shell parts of wind turbine blades for horizontal axis wind turbines (HAWTs). FIG. 1 illustrates a conventional modern upwind wind turbine according to the so-called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8. The rotor has a radius denoted R.

Figure 2:
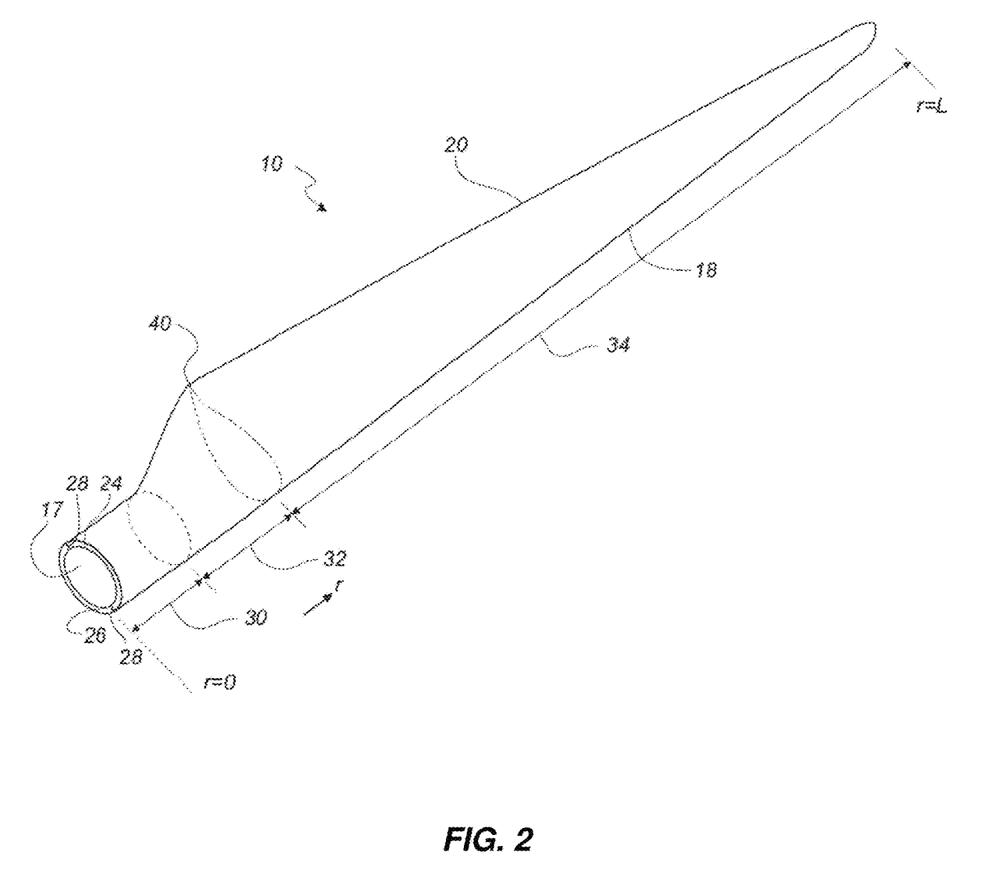
FIG. 2 shows a schematic view of a wind turbine blade.

FIG. 2 shows a schematic view of an exemplary wind turbine blade 10. The wind turbine blade 10 has the shape of a conventional wind turbine blade with a root end and a tip end and includes a root region 30 closest to the hub, a profiled or an airfoil region 34 furthest away from the hub and a transition region 32 between the root region 30 and the airfoil region 34. The blade 10 includes a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 includes a shell including two blade shell parts made of fiber-reinforced polymer and is typically made as a pressure side or upwind blade shell part 24 and a suction side or downwind blade shell part 26 that are glued together along bond lines 28 extending along the trailing edge 20 and the leading edge 18 of the blade 10. Typically, the root ends of the blade shell parts 24, 26 has a semi-circular or semi-oval outer cross-sectional shape.

Figure 3:
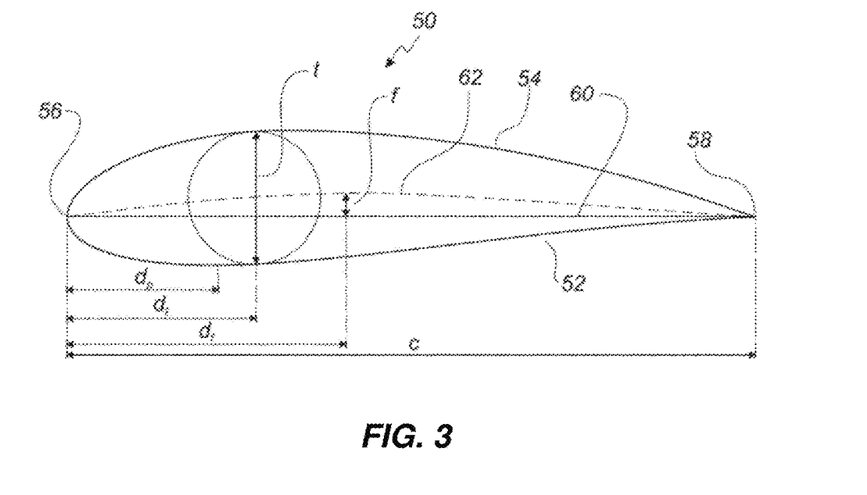
FIG. 3 shows a schematic view of an airfoil profile.
Figure 4:
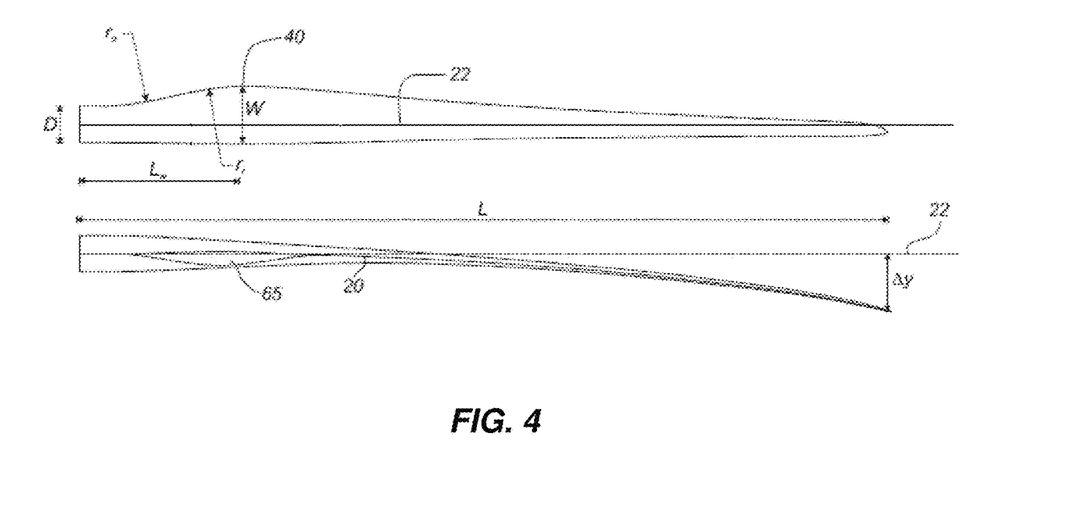
FIG. 4 shows a schematic view of a wind turbine blade, seen from above and from the side.

FIGS. 3 and 4 depict parameters, which may be used to explain the geometry of blade shell parts to be manufactured according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e., during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position r=$L_w$, and has a shoulder width W, which equals the chord length at the shoulder 40. The diameter of the root is defined as X. Further, the blade/blade shell parts is/are provided with a prebend, which is defined as Δy, which corresponds to the out of plane deflection from a pitch axis 22 of the blade.

Wind turbine blades have over the time become longer and longer and may now exceed a length of 70 meters. Further, the root diameter of blades has increased. The length of the blade, the root diameter as well as the shape of the blades with respect to shoulder, twist and prebending makes it increasingly difficult to provide wind turbine blades with sufficient and desired mechanical strength and dynamic properties.

Figure 5:
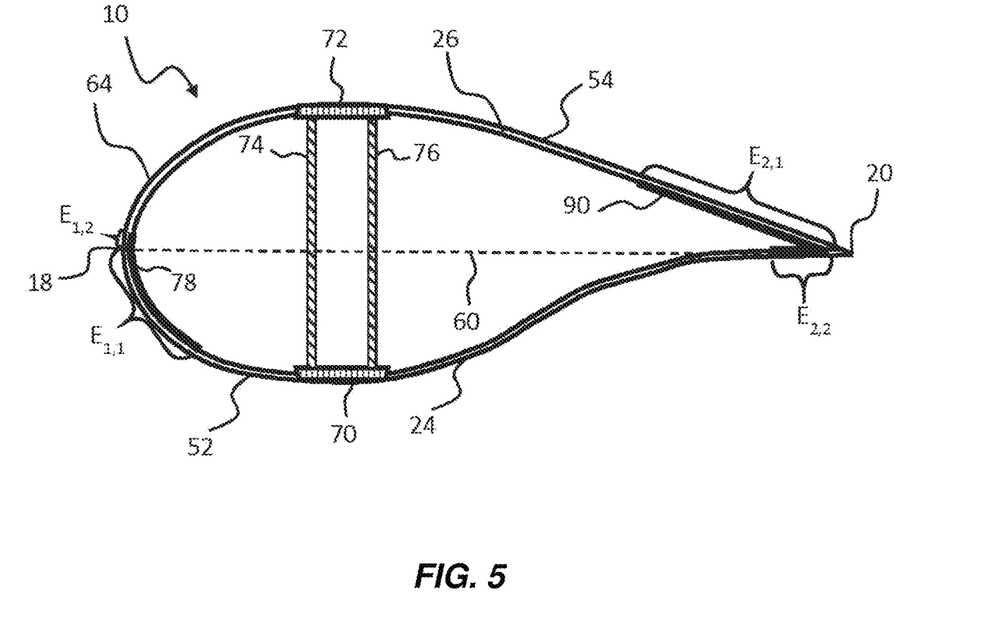
FIG. 5 shows a cross-sectional view of a wind turbine blade with a first load carrying structure arranged at a leading edge.

FIG. 5 is an exemplary first cross-section perpendicular to the longitudinal axis X of a wind turbine blade according to the present invention at a first distance from the root end of the wind turbine blade. The wind turbine blade 10 includes a profiled contour with a leading edge 18 and a trailing edge 20 and a chord 60 extending between the leading edge 18 and the trailing edge 20, a blade shell 64 with a pressure side 52 and a suction side 54, a first main spar cap 70 integrated in the pressure side of the blade shell 64, and a second main spar cap 72 integrated in the suction side of the blade shell 64. Further, the wind turbine blade 10 includes one or more shear webs including a first shear web 74 and optionally a second shear web 76, the shear web(s) being connected between the first main spar cap 70 and the second main spar cap 72.

The blade shell 64 includes a first load carrying structure 78 arranged at the leading edge 18, wherein the first load carrying structure has a first extension including a first primary extension $E_{1,1}$ on a first side (pressure side 52) of the chord 60. The first primary extension is at least 60% of the first extension ($E_{1,1}+E_{1,2}$). The first load carrying structure includes 20 layers of reinforcement material.

Further, the blade shell 64 optionally includes a second load carrying structure 90 arranged at the trailing edge 20, wherein the second load carrying structure has a second extension including a second primary extension $E_{2,1}$ on a second side (suction side 54) of the chord 60. The second primary extension is at least 60% of the second extension ($E_{2,1}+E_{2,2}$). The second load carrying structure 90 includes 20 layers of reinforcement material.

The first load carrying structure and optionally the second load carrying structure is/are designed to tailor the dynamic properties of the wind turbine blade, e.g., in order to improve the edgewise damping of the wind turbine blade.

Blade parameters for exemplary wind turbine blades B1, ..., B6 in a first cross section at a first distance and/or a second cross section at a second distance from the root end are set out in Table 1, wherein $E_{1,1}$ is the first primary extension and $E_1$ is the first extension of a first load carrying structure. $E_{2,1}$ is the second primary extension and $E_2$ is the second extension of a second load carrying structure. N1 is the number of reinforcement material layers for the first load carrying structure on a first side of the chord or on a first side of a glue joint of the wind turbine blade or on a first blade shell part of the wind turbine blade. N2 is the number of reinforcement material layers for the first load carrying structure on a second side of the chord or on a second side of a glue joint of the wind turbine blade or on a second blade shell part of the wind turbine blade. M1 is the number of reinforcement material layers for the second load carrying structure on a second side of the chord or on a second side of a glue joint of the wind turbine blade or on a second blade shell part of the wind turbine blade. M2 is the number of reinforcement material layers for the second load carrying structure on a first side of the chord or on a first side of a glue joint of the wind turbine blade or on a first blade shell part of the wind turbine blade. The different blade parameter values for different exemplary wind turbine blades may be taken alone, i.e., define a common parameter for a set of wind turbine blades according to the invention, or combined, e.g., $E_{1,1}/E_1$ for B1 may be combined with N1 of B4 as another exemplary wind turbine blade according to the invention. Further, blade parameter values for a wind turbine blade, such as B1, may be indicative for a first cross section of an exemplary wind turbine blade, and blade parameter values for another wind turbine blade, such as B5, may be indicative for a second cross section of the exemplary wind turbine blade.

TABLE 1

Blade parameters for exemplary wind turbine blades in first cross-sections

|  | B1 | B2 | B3 | B4 | B5 | B6 |
| --- | --- | --- | --- | --- | --- | --- |
| $E_{1,1}/E_1$ | >60% | 45%-70% | >70% | >70% | >80% | 80% |
| $E_{2,1}/E_2$ | >60% |  | >70% |  | >70% | 75% |
| N1 | >10 | >N2 |  | 10 | <N2 | >20 |
| N2 | >5 | <N1 |  | 10 | >N1 | >10 |
| M1 | >10 |  |  |  |  | >20 |
| M2 | >5 |  |  |  |  | >10 |

Figure 6:
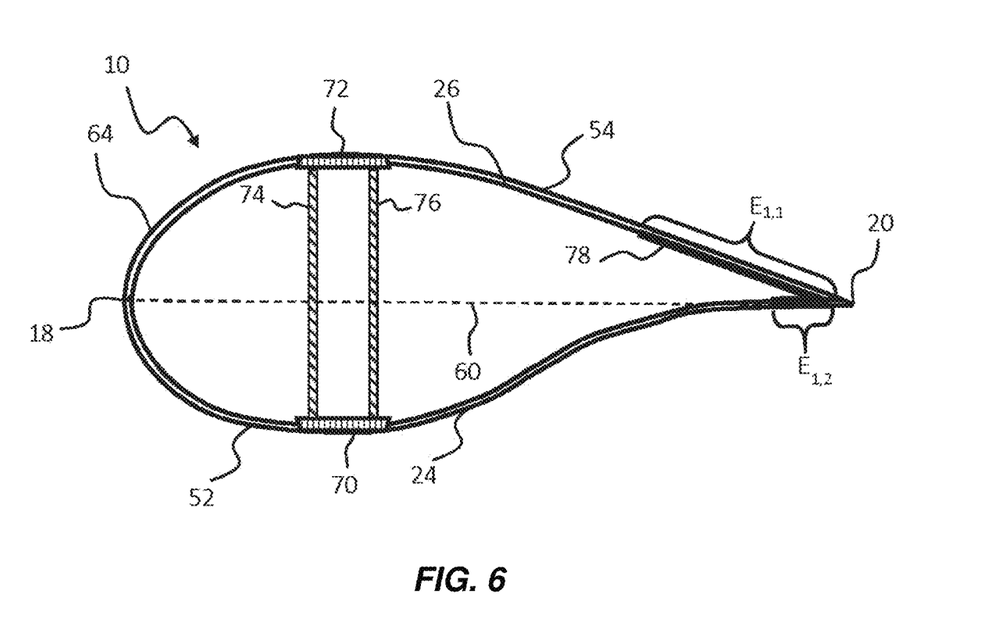
FIG. 6 shows a cross-sectional view of a wind turbine blade with the first load carrying structure of FIG. 5 arranged at a trailing edge.

FIG. 6 is an exemplary first cross-section perpendicular to the longitudinal axis X of a wind turbine blade according to the present invention at a first distance from the root end of the wind turbine blade. The wind turbine blade 10 includes a profiled contour with a leading edge 18 and a trailing edge 20 and a chord 60 extending between the leading edge 18 and the trailing edge 20, a blade shell 64 with a pressure side 52 and a suction side 54, a first main spar cap 70 integrated in the pressure side of the blade shell 64, and a second main spar cap 72 integrated in the suction side of the blade shell 64. Further, the wind turbine blade 10 includes one or more shear webs including a first shear web 74 and optionally a second shear web 76, the shear web(s) being connected between the first main spar cap 70 and the second main spar cap 72.

The blade shell 64 includes a first load carrying structure 78 arranged at the trailing edge 20, wherein the first load carrying structure has a first extension including a first primary extension $E_{1,1}$ on a first side (suction side 54) of the chord 60. The first primary extension is at least 60% of the first extension ($E_{1,1}+E_{1,2}$). The first load carrying structure includes 20 layers of reinforcement material.

The first load carrying structure and optionally the second load carrying structure is/are designed to tailor the dynamic properties, e.g., edgewise damping, of the wind turbine blade, e.g., in order to improve or obtain a desired edgewise damping of the wind turbine blade.

Figure 7:
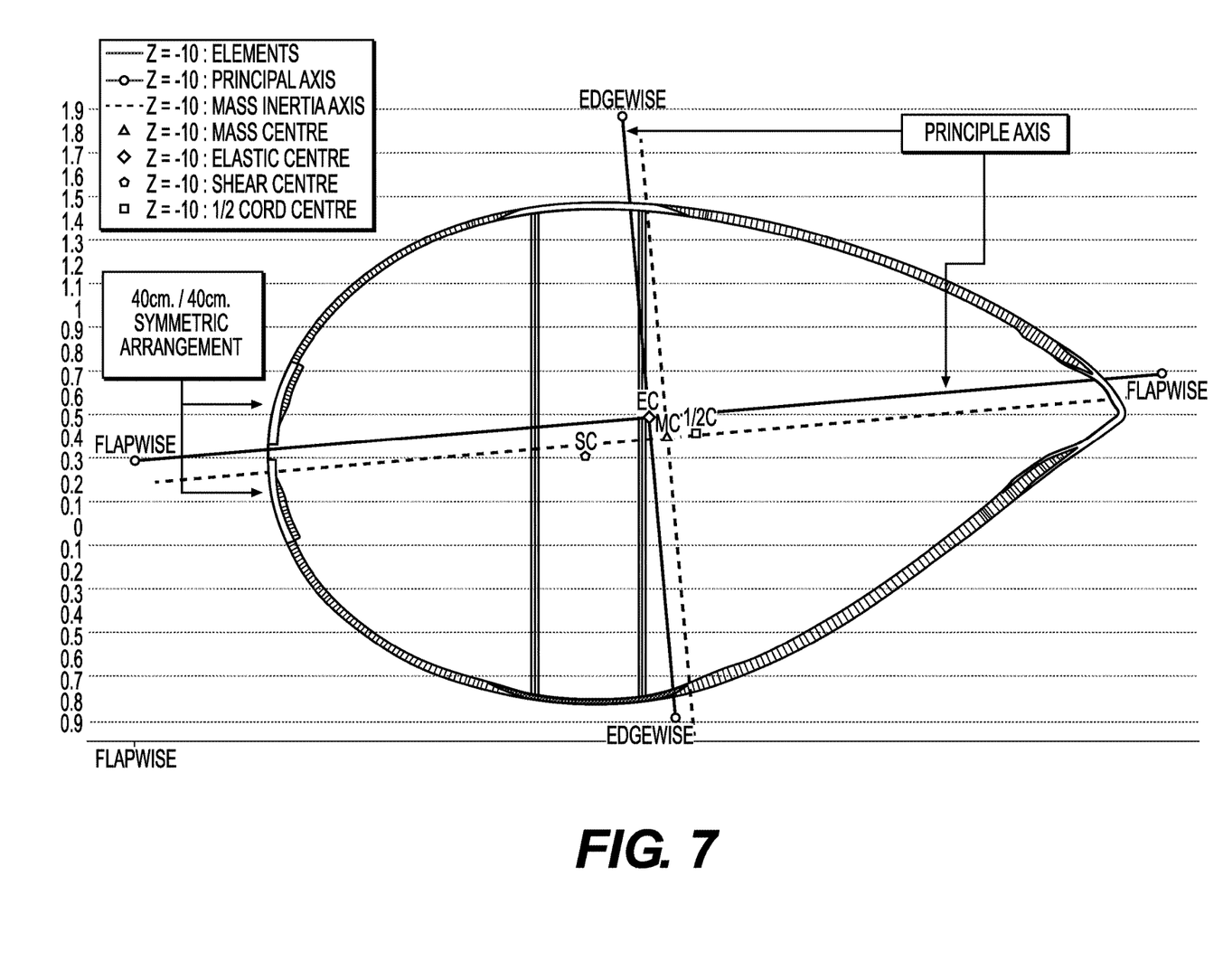
FIG. 7 shows simulation results for a wind turbine blade with a first load carrying structure arranged at the leading edge, symmetrically about the chord.

FIG. 7 shows simulation results for a wind turbine blade with a first load carrying structure arranged at the leading edge, symmetrically about the chord. In the simulation of FIG. 7, the first load carrying structure extends 40 cm. on either side of the chord line. In FIG. 7, the blue lines indicate the principal axis and the yellow lines represent the mass inertia axis.

Figure 8:
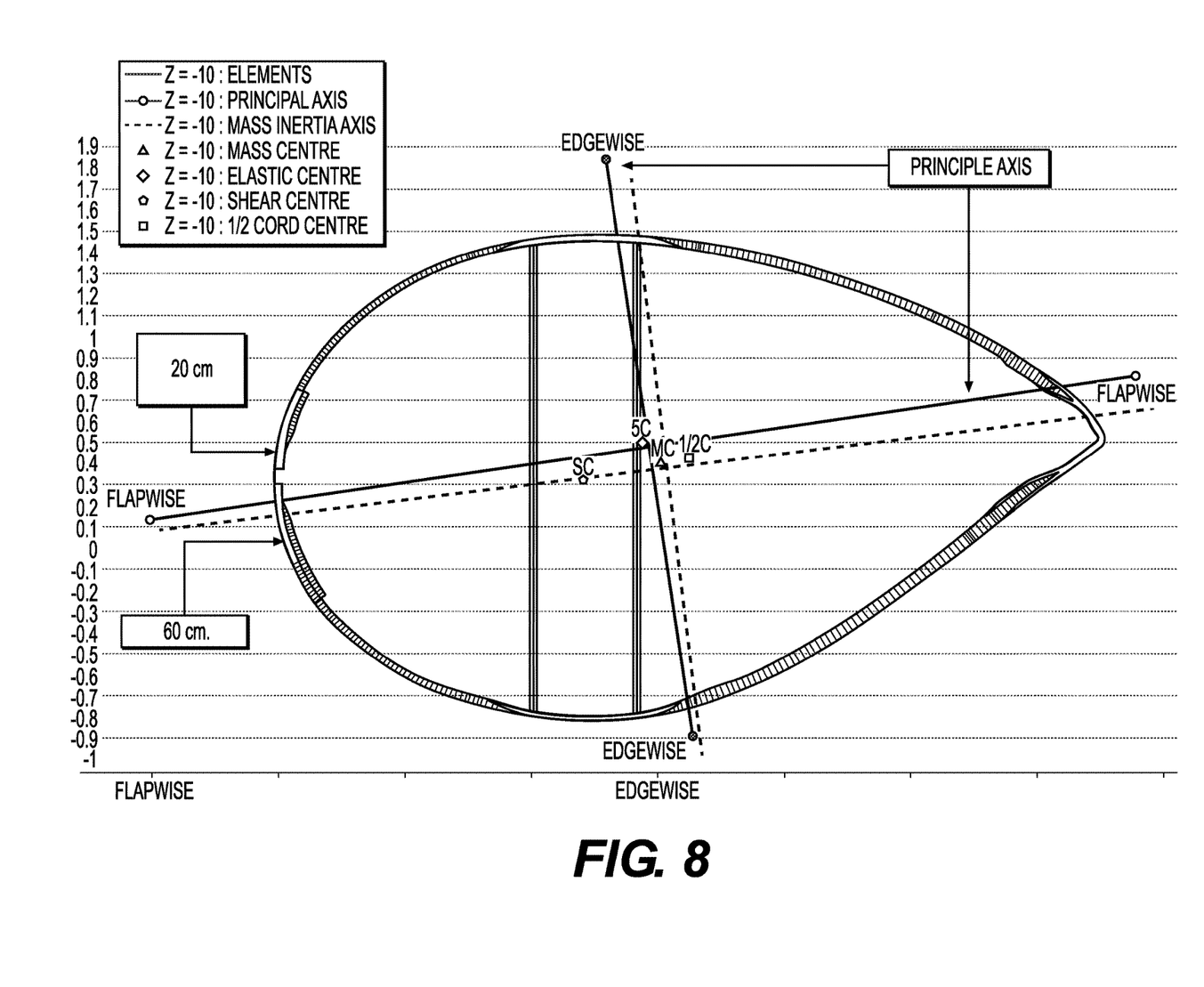
FIG. 8 shows simulation results for a wind turbine blade with a first load carrying structure arranged at the leading edge, asymmetrically about the chord.

FIG. 8 shows simulation results for a wind turbine blade with a first load carrying structure arranged at the leading edge, asymmetrically about the chord. In FIG. 8, the first load carrying structure extends 20 cm. above the chord, and 60 cm. below the chord. Again, the blue lines indicate the principal axis and the yellow lines represent the mass inertia axis. Compared against the symmetric arrangement of FIG. 7, the asymmetric arrangement of FIG. 8 is found to have a principal axis which is rotated counter clockwise, thus providing a greater increase in aero elastic damping. Specifically, the asymmetric arrangement of FIG. 8 changes the flapwise content in the edgewise mode shapes, which creates the increase in the aero elastic damping of the edgewise whirl modes.

Figure 9:
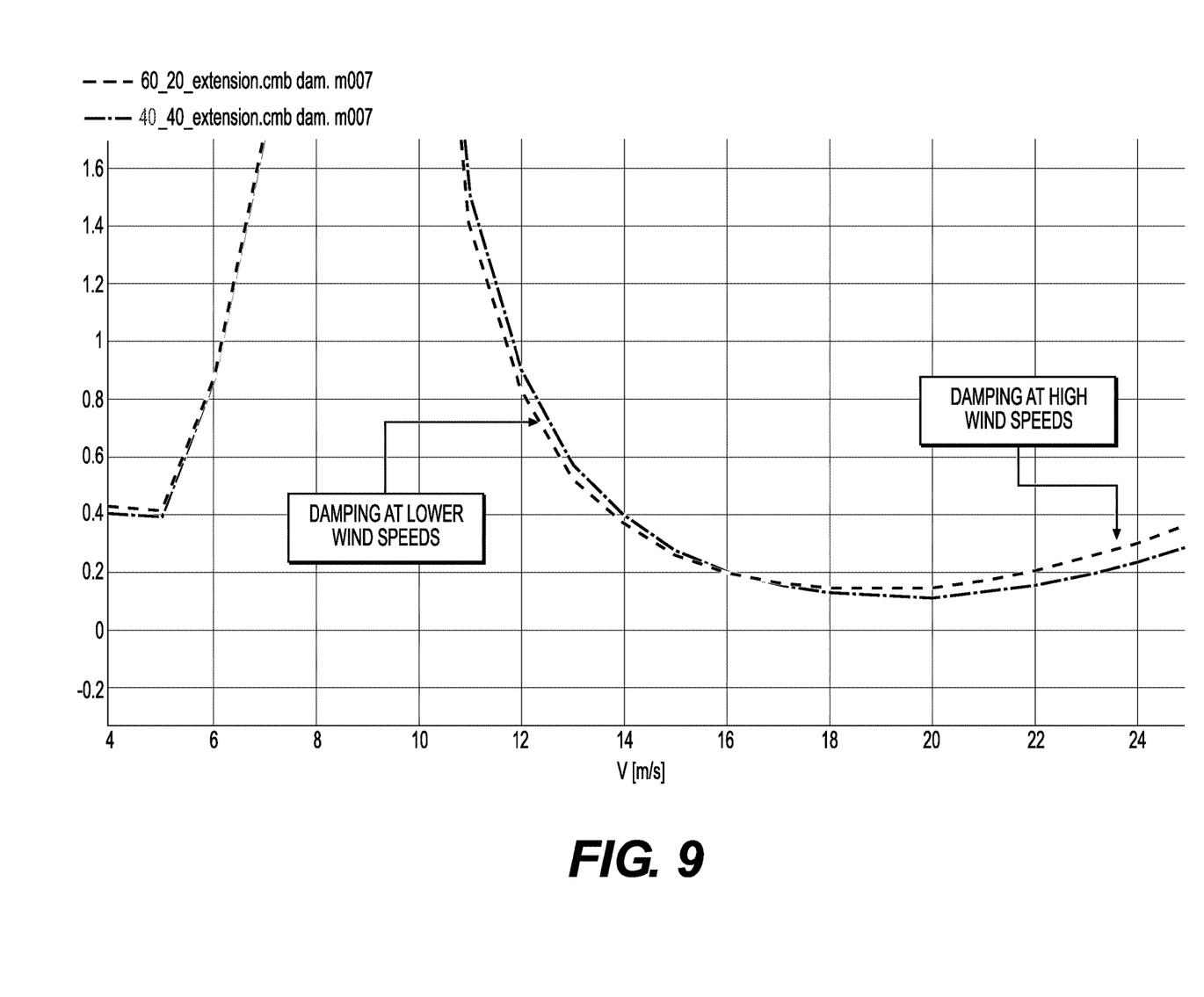
FIG. 9 is a graph comparing edgewise damping results from the simulated wind turbine blades of FIGS. 7 and 8.
Similar reference characters denote corresponding features consistently throughout the attached drawings.

For the simulated blades of FIGS. 7 and 8, the damping of the edgewise backward whirl mode was quite low, and it can be clearly seen in FIG. 9 that the asymmetric 60/20 configuration of FIG. 8 has higher damping than the 40/40 symmetric configuration of FIG. 7 at high wind speeds, where damping matters the most. Although the 60/20 asymmetric configuration of FIG. 8 has lower damping at lower wind speeds, this is insignificant, since the excitation energy at those wind speeds is much lower.

It is to be understood that the wind turbine blade and method of manufacturing a wind turbine blade are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

LIST OF REFERENCES 2 wind turbine
4 tower
6 nacelle
8 hub
10 wind turbine blade
14 blade tip
15 tip end section
16 blade root
17 root end face
18 leading edge
20 trailing edge
22 pitch axis
24 pressure side blade shell part/first or upwind blade shell part
26 suction side blade shell part/second or downwind blade shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
64 blade shell
70 first main spar cap
72 second main spar cap
74 first shear web
76 second shear web
78 first load carrying structure
90 second load carrying structure
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
Δy prebend
X longitudinal axis
$E_{1,1}$ first primary extension of first load carrying structure
$E_{1,2}$ first secondary extension of first load carrying structure
$E_{2,1}$ second primary extension of second load carrying structure
$E_{2,2}$ second secondary extension of second load carrying structure

We claim:

1. A wind turbine blade (10), comprising:
a profiled contour with a leading edge (56) and a trailing edge (58), and a chord (60) extending between the leading edge (56) and the trailing edge (58);
a blade shell (64) with a pressure side and a suction side;
a first main spar cap (70) integrated in the pressure side of the blade shell (64);
a second main spar cap (72) integrated in the suction side of the blade shell (64); and
one or more shear webs (74, 76) connected between the first main spar cap (70) and the second main spar cap (72),
wherein the blade shell (64) comprises at least a first load carrying structure (78) comprising one or more unidirectional fiber layers and being arranged at the leading edge (56), wherein the first load carrying structure has a first extension including a first primary extension ($E_{1,1}$) on a first side of the chord (60), wherein the first primary extension is at least 60% of the first extension, and wherein the first load carrying structure provides increased edgewise damping of the wind turbine blade at wind speeds above a minimal wind speed threshold, wherein the minimal wind speed threshold is between 16 m/s and 18 m/s.

2. The wind turbine blade according to claim 1, wherein the first extension of the first load carrying structure includes a first secondary extension ($E_{1,2}$) on a second side of the chord, wherein the first secondary extension is less than 20% of the first extension.

3. The wind turbine blade according to claim 1, wherein the first load carrying structure is arranged at the leading edge, wherein the first side of the chord is the pressure side, and wherein the first primary extension is at least 80% of the first extension.

4. The wind turbine blade according to claim 1, wherein the first load carrying structure comprises at least 10 layers of reinforcement material.

5. The wind turbine blade according to claim 1, wherein the blade shell comprises a second load carrying structure (90) arranged at the trailing edge, wherein the second load carrying structure has a second extension including a second primary extension ($E_{2,1}$) on a second side of the chord, and wherein the second primary extension is at least 60% of the second extension.

6. The wind turbine blade according to claim 5, wherein the second extension of the second load carrying structure includes a second secondary extension ($E_{2,2}$) on the first side of the chord, wherein the second secondary extension is less than 25% of the second extension.

7. The wind turbine blade according to claim 5, wherein the second load carrying structure is arranged at the trailing edge, wherein the second side of the chord is the suction side, and wherein the second primary extension is at least 80% of the second extension.

8. The wind turbine blade according to claim 5, wherein the second load carrying structure comprises at least 10 layers of reinforcement material.

9. The wind turbine blade according to claim 5, wherein the wind turbine blade comprises a first blade shell part and a second blade shell part, wherein the first load carrying structure is arranged in the first blade shell part, and wherein the second load carrying structure is arranged in the second blade shell part.

10. The wind turbine blade according to claim 1, wherein the first load carrying structure is asymmetric at the leading edge with respect to the chord.

11. The wind turbine blade according to claim 1, wherein the wind turbine blade comprises a first blade shell part and a second blade shell part, wherein the first load carrying structure is arranged in the first blade shell part.

12. A method of manufacturing a wind turbine blade comprising a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the first main spar cap and the second main spar cap, the method comprising:

arranging a first reinforcement fiber layup at the leading edge or the trailing edge, wherein the first reinforcement fiber layup has a first extension including a first primary extension on a first side of the chord, wherein the first primary extension is at least 60% of the first extension, wherein the first primary extension being at least 60% of the first extension provides increased edgewise damping of the wind turbine blade at wind speeds above a minimal wind speed threshold, wherein the minimal wind speed threshold is between 16 m/s and 18 m/s.

13. The method according to claim 12, wherein the method comprises the further step of arranging a second reinforcement fiber layup at the trailing edge, wherein the second reinforcement fiber layup has a second extension including a second primary extension on a second side of the chord, wherein the second primary extension is at least 60% of the second extension.

14. The method according to claim 12, wherein the method comprises the further step of supplying resin to the first and/or second reinforcement fiber layup and curing the resin to form a first blade shell part and/or a second blade shell part.

15. The method according to claim 12, wherein the method comprises the further step of joining first and second blade shell parts of the wind turbine blade.

* * * * *